Figure 1:
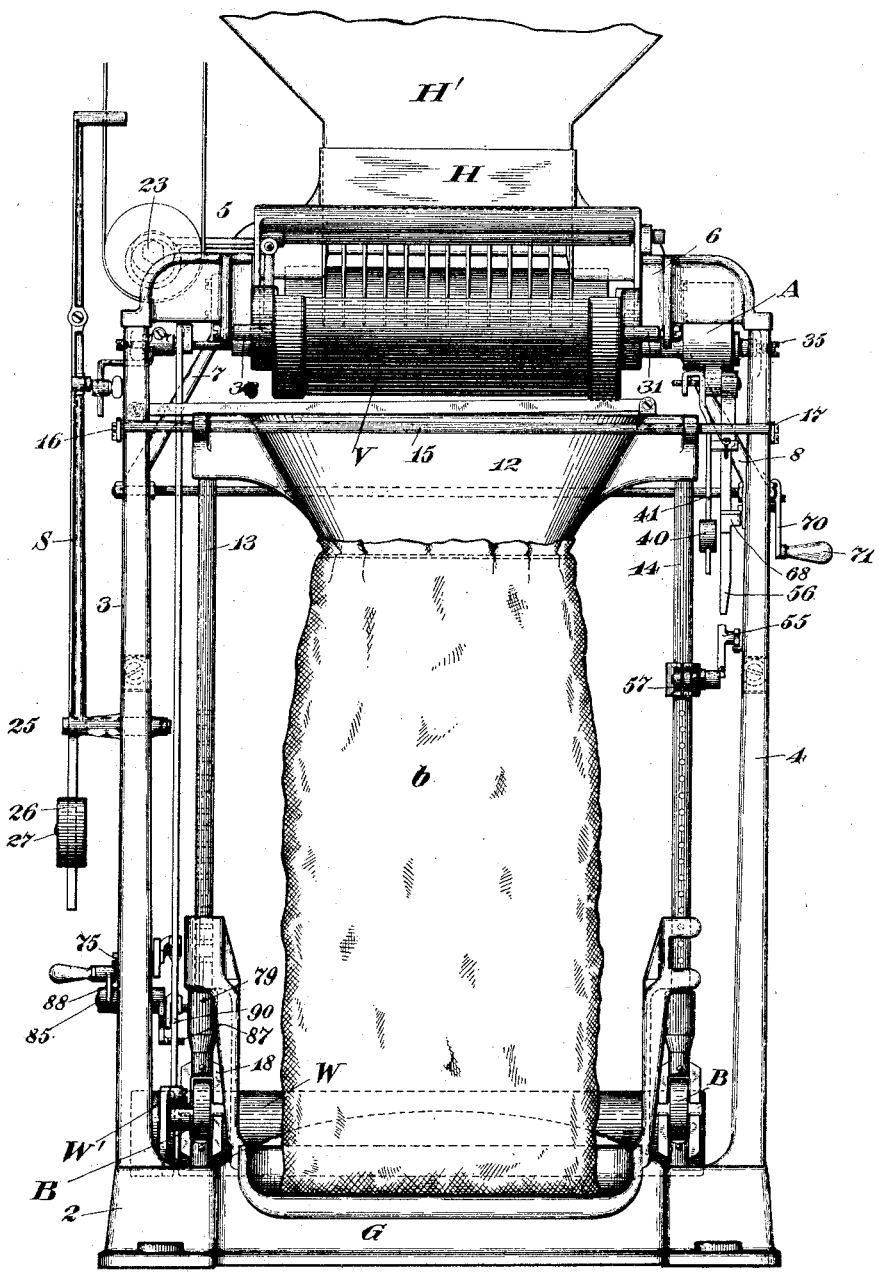

No. 616,852. Patented Dec. 27, 1898.
J. CHRISTIANSEN.
WEIGHING MACHINE.
(Application filed Nov. 29, 1897.)

(No Model.) 3 Sheets—Sheet 1.

Witnesses:
P. G. Hewitt,
Fred. J. Dole.

Inventor:
John Christiansen;
By his Attorney,
F. H. Richards.

No. 616,852. Patented Dec. 27, 1898.
J. CHRISTIANSEN.
WEIGHING MACHINE.
(Application filed Nov. 29, 1897.)
(No Model.) 3 Sheets—Sheet 2.
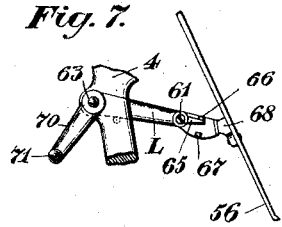
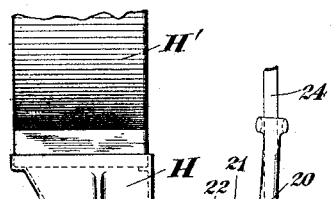
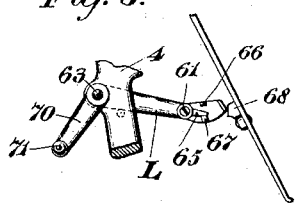
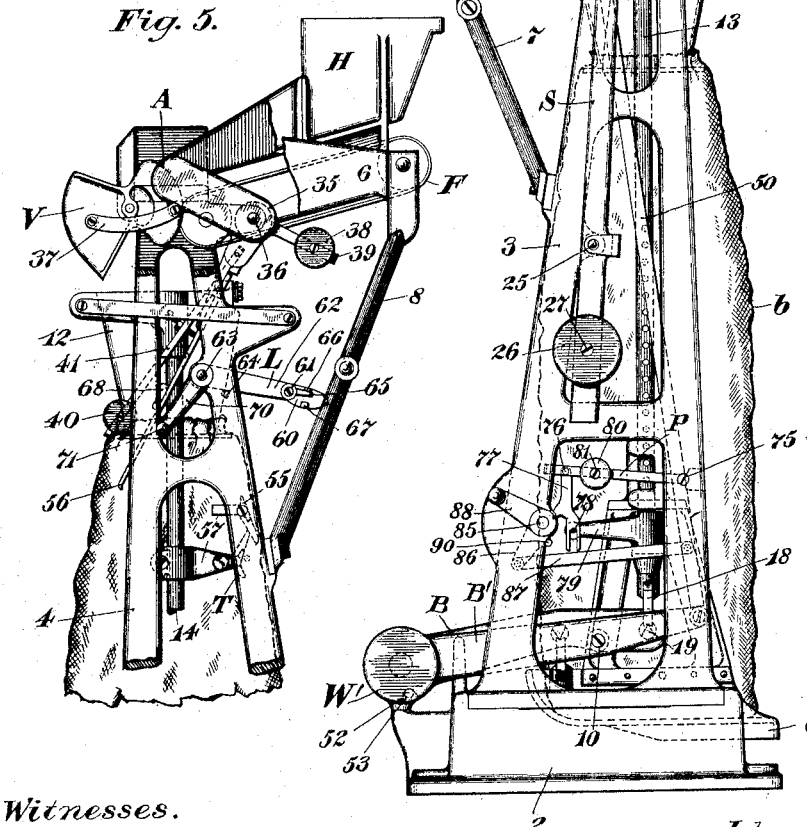
Witnesses.
P. G. Hewitt.
Fred. J. Dole.
Inventor:
John Christiansen;
By his Attorney,
F. H. Richards.
THE NORRIS PETERS CO., PHOTO-LITHO., WASHINGTON, D. C.

No. 616,852. Patented Dec. 27, 1898.
J. CHRISTIANSEN.
WEIGHING MACHINE.
(Application filed Nov. 29, 1897.)
(No Model.) 3 Sheets—Sheet 3.
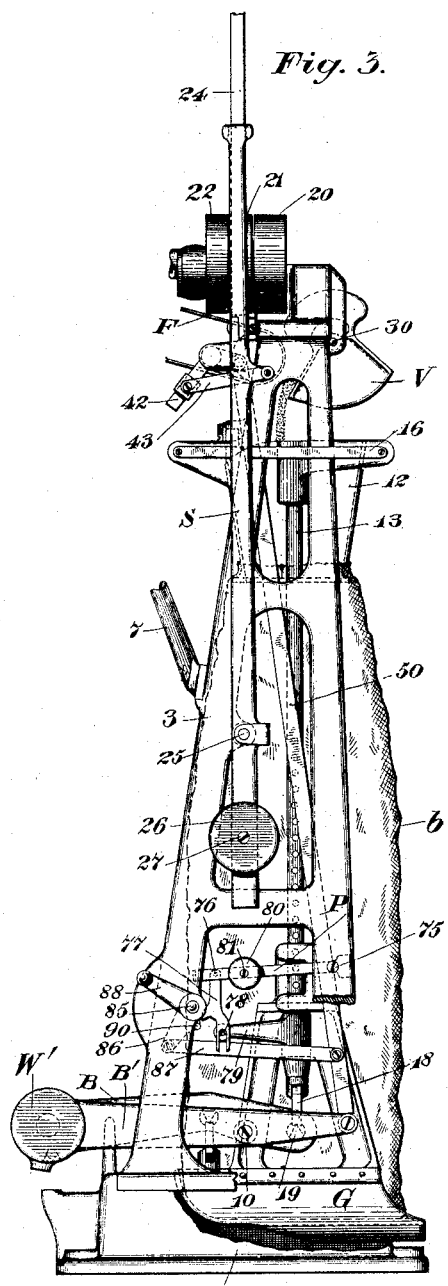
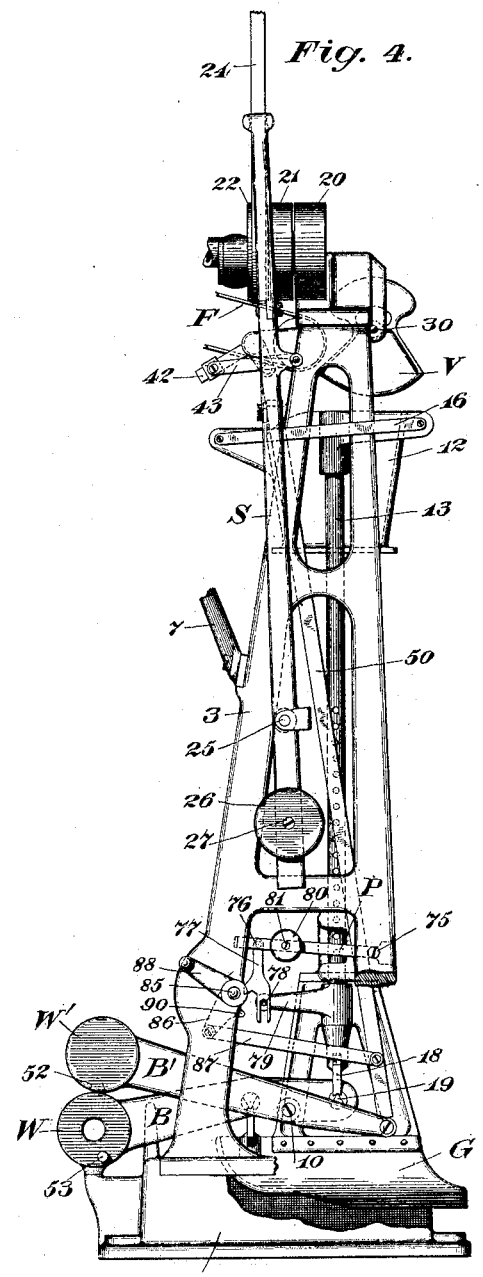
Witnesses:
F. G. Hewitt
Fred. J. Dole.
Inventor:
John Christiansen;
By his Attorney,
F. H. Richards.

UNITED STATES PATENT OFFICE.

JOHN CHRISTIANSEN, OF HARTFORD, CONNECTICUT, ASSIGNOR TO THE PRATT & WHITNEY COMPANY, OF SAME PLACE.

WEIGHING-MACHINE.

SPECIFICATION forming part of Letters Patent No. 616,852, dated December 27, 1898.

Application filed November 29, 1897. Serial No. 660,097. (No model.)

*To all whom it may concern:*

Be it known that I, JOHN CHRISTIANSEN, a citizen of the United States, residing at Hartford, in the county of Hartford and State of Connecticut, have invented certain new and useful Improvements in Weighing-Machines, of which the following is a specification.

This invention relates to weighing-machines, and more especially to that class thereof involving a bag or similar removable receptacle in which the supply of material is delivered to form a load, the supply being automatically controlled by suitable mechanism.

The invention includes as one of its features, in combination with weighing mechanism, a counterweighted lever fulcrumed on the support independent of and mounted to apply its effect to the weighing mechanism and the weight being slidable along the lever between its fulcrum and the point at which its effect is applied to the weighing mechanism, by reason of which a wide range of leverage may be obtained to suit different cases, the weight serving to carry the weighing mechanism down to the poising-line before the complete load is in the receptacle or bag, the balance flowing into the bag after the supply has actually been cut off. In this respect the machine is an improvement upon that covered by Letters Patent No. 548,841, granted to Francis H. Richards October 29, 1895.

The invention also includes, in combination with weighing mechanism involving a bag-carrier, means for supplying a stream of material, a valve, means for advancing the valve to arrest the supply to a bag or other receptacle, and automatically-operative means for preventing the retraction of the valve on the removal of a filled bag, it being understood, of course, that the weighing mechanism is lightened when the filled bag is taken from its support.

In the drawings accompanying and forming part of this specification, Figure 1 is a front elevation of my improved bagging-machine. Figs. 2, 3, and 4 are end elevations of the same as seen from the left in Fig. 1, showing the positions occupied by the different parts during the making of a load and on the removal of the filled bag. Fig. 5 is an opposite end elevation of the upper portion of the machine, parts being broken away. Figs. 6 and 7 are details in side elevation of the valve-blocking mechanism, and Fig. 8 is a sectional plan detail of the poise-weight.

Similar characters designate like parts in all the figures of the drawings.

The framework for supporting the different parts of the machine consists in the present case of the substantially U-shaped base or bed 2, the side frames or columns 3 and 4, mounted thereon, and the substantially L-shaped top beams 5 and 6, braced from the side frames 3 and 4, respectively, by the bars 7 and 8.

The supply chute or hopper H is secured to the top beams 5 and 6, and it is supplied with material from the bin H' and is located over the force-feeder F of ordinary construction, the force-feeder when driven serving to convey a stream of material from the hopper H into an empty bag mounted for the time being upon the weighing mechanism.

The weighing mechanism includes a scale-beam B and a valve-actuator B', movable with the scale-beam and preferably mounted thereon, the actuator B' consisting in the present case of an auxiliary beam pivoted at 10 to the main beam B, and the carrier G, upon which a bag, as *b*, may rest. The bag-mouth is placed about the funnel or hopper 12, located below the delivery end of the feed-belt F and secured at its opposite sides to the supports 13 and 14, bearing against the scale-beam and forming part of the weighing mechanism, the bag-carrier or bag-rest G being secured to and between the supports 13 and 14. The hopper 12 carries on its forward side the shaft 15, connected by a pair of guide-links, as 16 and 17, to the side frames 3 and 4, the lower ends of two supports being provided with notched or V-shaped bearings, as 18, bearing upon coöperating knife-edges 19 upon the poising or inner ends of the scale-beam B, which latter may be constructed and mounted as shown in the Letters Patent hereinbefore mentioned.

In weighing certain kinds of material it is usual to employ a power feed device, such as the feed-belt F, hereinbefore alluded to, to furnish a supply of material to the load-carrying receptacle, the greater part of the load being supplied by such device when driven at a high speed and the remainder of the load or the drip-supply being obtained by operating such force-feed device at a slower speed. I have shown mechanism involving a series of three pulleys, as 20, 21, and 22, the shaft 23 of which is connected with the force-feeder F through the intermediate speed-reducing gearing of common form. The pulleys 20 and 21 are fixed to the supporting-shaft 23, while the pulley 22 is loose thereon, and when the driving-belt 24 is upon the pulley 20 the feeder F will be driven at a high speed. On the shifting of the belt 24 to the pulley 21 the feeder F will be driven at its low speed to supply the drip or minor part of the load, and when the belt is slipped onto the loose pulley 22 the feeder F will be thrown out of action to stop the supply, at which time a valve or drizzle-catcher, such as V, is forced across the path of the flow of the supply-stream to catch the material from the feeder F on its stoppage.

I deem it unnecessary to illustrate the hereinbefore-mentioned speed-reducing gearing, as the same forms no part of my invention. Such gearing may be of the kind illustrated in Letters Patent No. 607,478, granted to F. H. Richards on July 19, 1898, for a weighing-machine.

The driving-belt 24 is usually automatically controlled from the weighing mechanism, the belt being shifted along the series of pulleys back and forth by a shipper, as S, consisting of a longitudinal lever pivoted, as at 25, upon the side frame 3 and having at its upper end the usual belt-engaging fingers between which the belt 24 travels, and balanced near its lower end by the weight 26, secured in a fixed position by the set-screw 27.

The valve V is of the "pan" type, and is provided with the oppositely-disposed trunnions 30 and 31 for receiving the usual pivot-screws on the framing, the valve being closed by gravity up to the poising period or when the smaller part of the load is supplied by the feeder, and beyond this point it is swung under the discharge edge of said feeder by extraneous means, as the actuator A, containing a rolling weight, as 35, incased in the actuator. The actuator A is secured to the transverse rock-shaft 36, which is between the upper and lower runs of the feed-belt F, and is connected with the valve V by the link 37. The valve-actuator A is partially balanced by the weight 38, secured to the arm 39, extending rearwardly therefrom.

At the commencement of operation the rolling actuator-weight 35 is at one end of the actuator A, and its center of gravity is on a vertical line with the center of the actuator-supporting shaft 36, as shown in Fig 5, so as to be of no effect as a valve-closing device. The primary advancing movement is imparted to the valve by the weight 40, secured to the arm 41 on the rock-shaft 36, the weight being located at some distance to the left of the perpendicular at the commencement of operation, and as said weight moves to the perpendicular it is operable for swinging the valve to the position in which it is shown in Fig. 3, at which time the further closure of the valve is intercepted by a stop, the floor or bottom of the actuator A at this stage being disposed slightly below the horizontal, so that the weight 35 can freely and quickly roll to the free end of said actuator, thereby to exert a powerful leverage for swinging the valve V rapidly under the discharge end of the belt F when the latter is thrown out of action. The shaft 36 is provided with a crank-arm 42, to which the link 43 is pivoted, said link being likewise connected to the belt-shipper S, by reason of which construction the shipper can be operated to cause the shifting of the belt 24 from the pulley 20 to the pulley 21, and then onto the pulley 22. The valve V is swung from under the discharge end of the feed-belt F by the auxiliary beam B', constituting an actuator, the thrust of the auxiliary beam being transmitted to the valve through the rod 50, pivoted at its upper end to the short crank-arm 51 on the shaft 36. The weight W' of the auxiliary beam and the weight W of the main beam form the counterpoise, and said parts normally act as one, the weight W' having a notch or recess 52, adapted to receive a pin or stop 53 on the adjacent weight W, by reason of which the poising end of the auxiliary beam constitutes, in effect, a fixed extension of the main beam B, so that when the two beams descend the inner end of the auxiliary beam by falling away from the rod 50 will permit the operation of the valve V in the manner hereinbefore specified. At a predetermined point in the operation of the valve or when the load is nearly completed the further operation of said valve will be interrupted by a by-pass stop, as 55, disposed in the path of and adapted to be engaged by the bar 56, in operation with the valve and preferably depending from the actuator-shaft 36, the bar striking the by-pass 55 at the commencement of the poising-period or when the belt 24 is on the pulley 21. On the completion of the load the by-pass will be disengaged from the bar by a tripper, as T, secured to the carrier 57 on the supporting-bar 14, in a manner familiar in this art.

On the completion of a load in the bag b the latter will be removed, and to prevent the opening of the valve V it will be blocked against retraction by a safety device or locker, as L, involving in its construction a self-operative and preferably "gravity" catch 60, pivoted, as at 61, to the arm 62 on the shaft 63, carried by the side frame 4, said arm 62 resting upon the stop 64 on the framework. The catch 60 is a gravity one, and its movement is limited by the stop 65, disposed between the lugs 66 and 67 on said catch, the latter being adapted to engage the bar 56.

When the valve has nearly reached the end of its advancing stroke, the offset 68 impinges against and raises the catch 60, as shown in Fig. 6, so that the bar and the valve can reach their extreme advanced positions, as shown, respectively, in Figs. 4 and 7. As soon as the offset passes out of contact with the catch the latter will drop behind the offset and serve to block the return movement of the valve and its actuator when the filled bag is removed. When the filled bag is taken from the carrier G, the main beam of course can return to its primary position, as shown in Fig. 4, but the valve V being locked, as set forth, the auxiliary beam B' is held against return movement by reason of its connection with the valve. To release the valve, the arm 62 will be raised to carry the catch 60 above the offset 68 on the bar 56, at which time the weight W' of the auxiliary beam B' can drop to impart an upward thrust to the rod 50 for retracting or swinging the valve V outward. For operating the catch I may provide an actuating crank-arm 70, secured to the rock-shaft 63, having a handle 71 at its free end, which may be grasped by an attendant to raise the arm 62, and consequently the catch 60, above the offset 68 to effect the release of the valve V, and consequently the actuator B'.

As is well known, it is necesary to support upon the weighing mechanism a load of material of the requisite standard to secure the complete operation of the valve or stream-controller, and it is customary to apply to the weighing mechanism a poise-weight which augments the effect thereof to such an extent as to secure the complete operation of the valve before the actual load is in the load-receptacle, the balance being in the air between the discharge end of the valve and the mass in the receptacle, the purpose of such a poise-weight being to compensate for a small portion of material in the air, as shown and described in the Letters Patent hereinbefore alluded to. In the present case I employ a weighted lever, as P, fulcrumed or pivoted, as at 75, to the side frame 3, and pivoted at its opposite end, as at 76, to the carrier 77, which is bifurcated at its lower end and rests upon the pivot or knife-edge 78, secured to the projection 79 on the support 13, as shown in the several side elevations. The lever carries a weight 80, which is slidable without obstruction between the pivotal point 76, at which the effect of the weighted lever is applied to the weighing mechanism and the fulcrum 75, the weight being held in an adjusted position by the set-screw 81 engaging the lever. The lever is substantially U-shaped at one end, as shown in Fig. 8, by reason of which the unobstructed movement of the weight 80 between the two pivotal points 75 and 76 is assured. The weight 80 is slidable between the two points indicated to obtain different amounts of leverage upon the weighing mechanism to suit different cases or materials.

When a test is to be made, the effect of the weighted lever should be removed from the weighing mechanism, and to accomplish this operation the carrier 77 is elevated to shift the same off the pivot or knife-edge 78 by suitable hand-operated means, now to be described. A rock-shaft is shown, as at 85, carrying a crank-arm 86, to which the link 87 is pivoted, the opposite end of the link being likewise jointed to the thrust-rod 50. The shaft 85 carries an operating crank-arm 88, by manipulating which the link 87 can be thrust to the right to carry the lower end of the rod 50 off the auxiliary beam B'. When a test is to be made, the pin 90 will be simultaneously carried into the notch 91 on the poise-weight carrier 77 to lift the latter off the knife-edge 78.

In the supply mechanism of my improved weighing-machine it will be understood from the previous description that the stream-controlling valve V and the counterbalanced actuator A are connected to have synchronous movements and movements in the same direction, and the rolling weight-case 35 is counterbalanced by the weight 38 in such a manner as substantially to neutralize its weight, and thus leave its effective control of the valve entirely to the shiftable weight 36 in said case. The linkage 37, by which the valve and casing are coupled together, is so arranged that it and the casing form a toggle mechanism and serve to hold the stream-controller in its open position with a minimum pressure, and at the commencement of the poising period the detent-arm 55 on the framework is released to a material extent and the friction between said part and the bar 56 is reduced to a minimum. For regulating the pressure between the parts the weight 38 may be adjusted along the arm 39 to the requisite degree.

The operation of the herein-described machine, briefly stated, is as follows: The parts are represented in Fig. 2 as occupying their primary positions, the bag b being empty and on the rest or carrier G, and the valve V being wide open, and the belt 24 being on the pulley 20, whereby the feeder F will be operated to supply a stream of material to the said bag. When a certain proportion of the load has been received, the carrier or bag-rest G, together with the poising end of the beam B and the actuator B', will descend, and said actuator, falling away from the rod 50, will permit the closure of the valve in the manner hereinbefore described and the simultaneous movement of the shipper S, the motions of these parts being concluded when the full load is in the bag, at which time the supply-stream will have been arrested by the stoppage of the feeder and the closure of the valve.

Having described my invention, I claim—

1. The combination, with weighing mechanism involving a bag-carrier, of stream-supplying means including a valve supported independently of the weighing mechanism; valve-advancing means; and automatically-operative means for preventing the opening movement of the valve on the removal of the filled bag.

2. The combination, with weighing mechanism embodying a bag-carrier, of stream-supplying means including a valve supported independently of the weighing mechanism; valve-advancing means; automatically-operative means for preventing the opening movement of the valve on the removal of the filled bag; and means for effecting the release of the valve.

3. The combination, with weighing mechanism involving a bag-carrier, of stream-supplying means including a valve supported independently of the weighing mechanism; valve-advancing means; automatically-operative means for preventing the opening movement of the valve on the removal of the filled bag; and hand-controlled means for effecting the release of the valve.

4. The combination, with weighing mechanism involving a bag-carrier, of stream-supplying means including a valve supported independently of the weighing mechanism; valve-advancing means; and self-active means for preventing the opening movement of the valve on the removal of the filled bag.

5. The combination, with weighing mechanism embodying a bag-carrier, of stream-supplying means including a valve supported independently of the weighing mechanism; valve-advancing means; and a gravitative device for preventing the opening movement of the valve on the removal of the filled bag.

6. The combination, with weighing mechanism embodying a bag-carrier, of stream-supplying means including a valve supported independently of the weighing mechanism; valve-advancing means; an actuator operative with the weighing mechanism for opening the valve; and automatically-operative means for preventing the opening movement of the valve by said actuator on the removal of the filled bag.

7. The combination, with weighing mechanism involving a bag-carrier, of stream-supplying means including a valve; valve-advancing means; an actuator mounted upon, and movable with, the weighing mechanism; means between the actuator and the valve for swinging said valve open; and automatically-operative means for preventing the opening movement of the valve on the removal of the filled bag and thereby also locking the actuator against return movement with the weighing mechanism.

8. The combination, with weighing mechanism embodying a bag-carrier, of stream-supplying means including a valve supported independently of the weighing mechanism; valve-advancing means; a bar operative with the valve; and automatically-operative means for engaging the bar when the valve has reached its extreme advanced position, and for locking said valve against return movement on the removal of a filled bag.

9. The combination, with weighing mechanism embodying a bag-carrier, of stream-supplying means including a valve; valve-advancing means; a bar operative with the valve; an arm carried by the framework; a catch pivoted to said arm and adapted to be engaged by, and to block the operation of, the bar; and stops for engaging the catch and carrying-arm, respectively.

10. The combination, with weighing mechanism embodying a bag-carrier, of stream-supplying means including a valve; valve-advancing means; a bar operative with the valve; a shaft carried by the framework, carrying arms at its opposite ends, one of which is adapted to be hand-operated; a catch pivoted to the other arm and limited by a stop thereon, said stop being adapted to engage and block the operation of the bar.

11. The combination, with weighing mechanism, of a weighted lever fulcrumed on a support independent of, and mounted to apply its effect to, the weighing mechanism, the weight being slidable along said lever between its fulcrum and the point at which its effect is applied to the weighing mechanism.

12. The combination, with weighing mechanism, of a weighted lever fulcrumed on a support independent of, and mounted to apply its effect to, the weighing mechanism, said lever being substantially U-shaped at one end, said weight being freely slidable along said lever between its fulcrum and the point at which its effect is applied to the weighing mechanism.

13. The combination, with weighing mechanism, of a weighted lever fulcrumed on a support independent of, and mounted to apply its effect to, the weighing mechanism, and the weight being slidable along said lever between its fulcrum and the point at which its effect is applied to the weighing mechanism; and means for shifting said weighted lever.

14. The combination, with weighing mechanism involving an upright support having a projection, of a carrier bifurcated at its lower end and resting on a knife-edge on said projection; a weighted lever pivoted, respectively, to the carrier and to the framework; and means on the framework for engaging said carrier to lift the same.

15. The combination, with weighing mechanism, of a weighted lever fulcrumed on a support independent of, and mounted to apply its effect to, the weighing mechanism, and the weight being slidable along said lever between its fulcrum and the point at which its effect is applied to the weighing mechanism; a valve; means including a rod for operating the valve; and instrumentalities for simultaneously shifting the weighted lever and the rod, thereby to throw the weighted lever and the rod each out of operative relation with the weighing mechahism.

16. The combination, with weighing mechanism, of a stream-controller; an oscillatory actuator including a traveling weight having an uninterrupted stroke between two points at which it can exert, respectively, its minimum and maximum stream-controller-operating efficiency; and means for arresting the progress of the actuator and for holding the same during the time said weight is at its maximum stream-controller-actuating efficiency, and for subsequently releasing the same, whereby said actuator can apply to the stream-controller its maximum power in the continued movement of said stream-controller.

17. In a weighing-machine, the combination, with weighing mechanism, of a supply apparatus therefor having a stream-controller; an actuator for the stream-controller connected thereto by linkage, whereby the actuator and the linkage together form a toggle for operating the stream-controller; a detent for holding the actuator in an intermediate position; a rolling weight carried by the actuator; and means for subsequently releasing said actuator to permit its continued movement.

JOHN CHRISTIANSEN.

Witnesses:
F. N. CHASE,
JOHN O. SEIFERT.